(12) United States Patent
Nakagawa et al.

(10) Patent No.: US 9,496,953 B2
(45) Date of Patent: Nov. 15, 2016

(54) DEVICE AND METHOD FOR MONITORING OPTICAL SIGNAL QUALITY, AND OPTICAL TRANSMISSION DEVICE

(71) Applicant: FUJITSU LIMITED, Kawasaki-shi, Kanagawa (JP)

(72) Inventors: Goji Nakagawa, Sagamihara (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/537,396

(22) Filed: Nov. 10, 2014

(65) Prior Publication Data
US 2015/0155934 A1 Jun. 4, 2015

(30) Foreign Application Priority Data
Nov. 29, 2013 (JP) ................................. 2013-248260

(51) Int. Cl.
*H04B 10/079* (2013.01)
*H04B 10/077* (2013.01)

(52) U.S. Cl.
CPC ...... *H04B 10/0795* (2013.01); *H04B 10/0775* (2013.01); *H04B 2210/074* (2013.01)

(58) Field of Classification Search
None
See application file for complete search history.

(56) References Cited

U.S. PATENT DOCUMENTS

| 7,440,170 | B2 | 10/2008 | Kao et al. |
| 2007/0297043 | A1 | 12/2007 | Kao et al. |
| 2008/0080856 | A1 | 4/2008 | Kagawa |
| 2009/0196603 | A1 | 8/2009 | Zhou et al. |
| 2012/0106951 | A1 | 5/2012 | Wan et al. |

FOREIGN PATENT DOCUMENTS

| EP | 2 264 916 A1 | 12/2010 |
| JP | 2008-85836 | 4/2008 |
| JP | 2010-226499 | 10/2010 |

OTHER PUBLICATIONS

Extended European Search Report issued Apr. 9, 2015 in corresponding European Patent Application No. 14193864.7.
Ji et al., "Optical performance monitoring techniques based on pilot tones for WDM network applications", Journal of Optical Networking, vol. 3. No. 7, Jun. 14, 2004, pp. 510-533.

*Primary Examiner* — Darren E Wolf
(74) *Attorney, Agent, or Firm* — Staas & Halsey LLP

(57) ABSTRACT

A device for monitoring optical signal includes: an optical filter configured to allow part of a spectrum of an optical signal on which a frequency or phase modulated signal is superimposed to pass; and a detection unit configured to detect signal quality of the optical signal, based on a power ratio of a signal component to a noise component of the modulated signal, the power ratio being obtained based on a power change in accordance with the modulated signal of light that has been caused to pass through the optical filter.

19 Claims, 15 Drawing Sheets

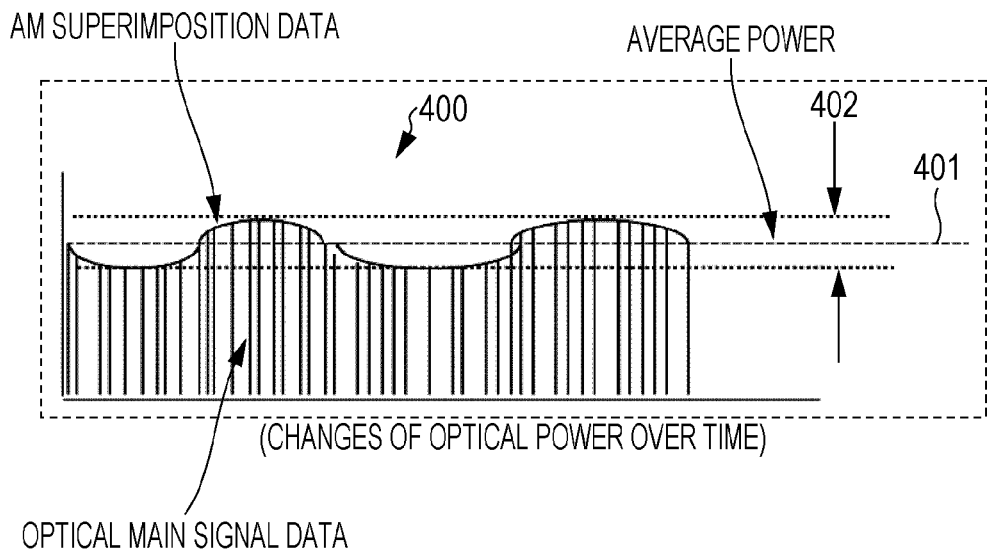

DEVICE AND METHOD FOR MONITORING OPTICAL SIGNAL QUALITY, AND OPTICAL TRANSMISSION DEVICE

CROSS-REFERENCE TO RELATED APPLICATION

This application is based upon and claims the benefit of priority of the prior Japanese Patent Application No. 2013-248260, filed on Nov. 29, 2013, the entire contents of which are incorporated herein by reference.

FIELD

The embodiment discussed herein is related to a device for monitoring optical signal, an optical transmission device, and a method for monitoring optical signal.

BACKGROUND

In order to detect abnormalities, faults, and so forth of optical transmission devices, optical transmitters and optical receivers, optical transmission paths, and so forth, devices that monitor signal quality (for example, an optical-signal-to-noise ratio (OSNR)) of optical signals being used are used in some optical transmission networks (or systems).

In next-generation optical networks, it is expected that the wavelengths and routes of optical signals will be more dynamically changed. It is therefore considered that devices that monitor signal quality will become more important in the future.

As exemplary techniques for estimating or monitoring signal quality of optical signals, the techniques disclosed in U.S. Patent Application Publication No. 2012/0106951, U.S. Pat. No. 7,440,170, Japanese Laid-Open Patent Publication No. 2010-226499, and Japanese Laid-Open Patent Publication No. 2008-085836 are known.

In the technique described in U.S. Patent Application Publication No. 2012/0106951, as illustrated in FIG. 16, amplitude-modulated data (hereinafter referred to as "AM data") 402 is superimposed on a transmission-light (optical) main signal (optical payload) 400. Note that FIG. 16 illustrates changes of optical power over time, and reference numeral 401 denotes average power of the optical main signal 400.

The optical main signal on which the AM data is superimposed is filtered around the signal center wavelength (filter position 1) and at a wavelength (filter position 2) shifted from the signal center wavelength by using a narrow-band optical filter as illustrated in FIG. 17. Photoelectric conversion of the filtered optical signal is performed, and the direct-current (DC) component and the alternating current (AC) component of the signal after the photoelectric conversion are measured.

In other words, $V_{ADC\text{-}DC1}$ and $V_{ADC\text{-}AC1}$ are measured as the DC component and the AC component at the filter position 1, respectively, and $V_{ADC\text{-}DC2}$ and $V_{ADC\text{-}AC2}$ are measured as the DC component and the AC component at the filter position 2, respectively.

Here, $V_{ADC\text{-}DC1}$, $V_{ADC\text{-}AC1}$, $V_{ADC\text{-}DC2}$, and $V_{ADC\text{-}AC2}$ represent voltage values obtained by analog-to-digital conversion (ADC) of the signals after photoelectric conversion, and are expressed, as illustrated in FIG. 17, by the following formulas (1. 1) to (1. 4).

$$V_{ADC\text{-}DC1} = V_{Sig\text{-}DC} + V_{ASE} \quad (1.1)$$

$$V_{ADC\text{-}AC1} = V_{Sig\text{-}AC} \quad (1.2)$$

$$V_{ADC\text{-}DC2} = V_{Sig\text{-}DC} * R + V_{ASE} \quad (1.3)$$

$$V_{ADC\text{-}AC2} = V_{Sig\text{-}AC} * R \quad (1.4)$$

Note that "$V_{Sig\text{-}DC}$" and "$V_{Sig\text{-}Ac}$" represent the voltages of the DC component and the AC component of the main signal, respectively, and "$V_{ASE}$" represents the voltage of a spontaneous emission light component. "R" represents a damping coefficient related to shifting from the filter position 1 to the filter position 2, and is a value satisfying the condition of 0<R<1.

The OSNR to be determined is a ratio ($P_{Sig}/P_{ASE}$) of main signal optical power ($P_{Sig}$) to spontaneous emission optical power ($P_{ASE}$) and therefore be determined by ($V_{Sig\text{-}DC}/V_{ASE}$) as expressed in the following formula (1. 5).

$$OSNR = P_{Sig}/P_{ASE} = V_{Sig\text{-}DC}/V_{ASE} \quad (1.5)$$

Here, since four equations (1. 1) to (1. 4) exist for four unknowns in the aforementioned formulas (1. 1) to (1. 4), $V_{Sig\text{-}DC}/V_{ASE}$ may be determined. In this way, in the technique disclosed in U.S. Patent Application Publication No. 2012/0106951, the OSNR is estimated from the ratio between the DC component and the AC component of a signal obtained by filtering an optical main signal on which AM data is superimposed, at different filter positions 1 and 2.

Next, U.S. Pat. No. 7,440,170 describes that the OSNR is estimated from power of an optical signal that has been caused to pass through a Mach-Zehnder interference (MZI) filter. That is, the transmission characteristic of an MZI filter, which has a periodic transmission characteristic, is shifted through temperature control, and transmitted optical power (the maximum ($P_{MAX}$) and the minimum ($P_{MIN}$) of each of the signal light component and the noise light component) is measured.

Here, assuming that $P_{MAX}/P_{MIN}=R$ and that the noise equivalent bandwidth is represented by NEB (constant), the OSNR to be determined is expressed by the following formula (2. 1). $P_s/P_n$ in formula (2. 1) is expressed by the following formula (2. 2).

$$OSNR = 10\log10\left(\frac{P_s}{P_n} \cdot \frac{NEB}{12.5\text{ GHz}}\right) \quad (2.1)$$

$$\frac{P_s}{P_n} = \left[\frac{(n+1)(s-n)}{(R-n)(s+1)} - \frac{n+1}{s+1}\right]^{-1} \quad (2.2)$$

In formula (2. 1), s represents the ratio between the maximum and the minimum of transmitted optical power from the MZI filter for signal light that does not contain a noise light component, and n represents the ratio between the maximum and the minimum of transmitted optical power of the MZI filter for the noise light component that does not contain a signal light component. The values of s and n are values that may be calculated from the characteristic of the MZI filter. Therefore, from the measured value R and the values of s and n, the OSNR may be determined by the above formula (2. 1) and formula (2. 2).

Next, in the technique described in Japanese Laid-Open Patent Publication No. 2010-226499, in a transmission device, the frequencies of carrier light are modulated at frequencies that are different for respective polarization channels, polarization-multiplexing is performed, and the result is transmitted to an optical transmission path. In an optical signal quality monitoring device, four types of polarization components are detected for each light intensity component for every unit optical frequency of a data-modulated optical signal received from the optical transmission path, and a Stokes vector is calculated by computing the intensity of each type of polarization component. Then, the intensity of a frequency-modulated component added to each polarization channel is extracted from the calculated Stokes vector. Thus, the polarization state for every polarization channel may be monitored without optical polarization splitting of data-modulated light.

Next, Japanese Laid-Open Patent Publication No. 2008-085836 describes an optical signal quality monitoring device in which an input optical signal and a local oscillator signal are mixed, at least one beat component of the mixed signal is extracted by a band-pass filter, and the intensity of the extracted beat component is detected. With this optical signal quality monitoring device, if the quality (OSNR) of the input light signal is good, the beat components do not spread by the mixing. When the mixed signal is caused to pass through the band-pass filter, most of the beat components pass through the filter without being filtered out. If, however, the OSNR of the input light signal is poor, the beat components spread by the mixing. When the mixed signal is caused to pass through the band-pass filter, some of the beat components are filtered out. In this way, the OSNR of an input light signal may be monitored by utilizing the fact that the power of an output signal of the band-pass filter varies depending on whether the OSNR of the input light signal is good or poor.

However, in the technique described in U.S. Patent Application Publication No. 2012/0106951, since the AM data is superimposed on the main signal, degradation (penalty) occurs in the main signal. Additionally, in the technique described in U.S. Pat. No. 7,440,170, if band narrowing arises from the fact that an optical signal passes through a plurality of wavelength selection switches (WSS) for transmission, the value of $P_{MAX}/P_{MIN}=R$ described above changes. This results in an OSNR calculation error. Additionally, the MZI filter has to be temperature controlled, and therefore control and the configuration are made complicated.

Note that the technique described in Japanese Laid-Open Patent Publication No. 2010-226499 is capable of monitoring the polarization state, but is not capable of monitoring the OSNR. Additionally, the technique described in Japanese Laid-Open Patent Publication No. 2008-085836 uses a local oscillator signal source, and therefore the configuration becomes complicated.

SUMMARY

According to an aspect of the invention, a device for monitoring optical signal includes: an optical filter configured to allow part of a spectrum of an optical signal on which a frequency or phase modulated signal is superimposed to pass; and a detection unit configured to detect signal quality of the optical signal, based on a power ratio of a signal component to a noise component of the modulated signal, the power ratio being obtained based on a power change in accordance with the modulated signal of light that has been caused to pass through the optical filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is an illustration for explaining an example of the related art described in U.S. Patent Application Publication No. 2012/0106951; and FIG. 17 is an illustration for explaining the example of the related art described in U.S. Patent Application Publication No. 2012/0106951.

DESCRIPTION OF EMBODIMENT

Figure 1:
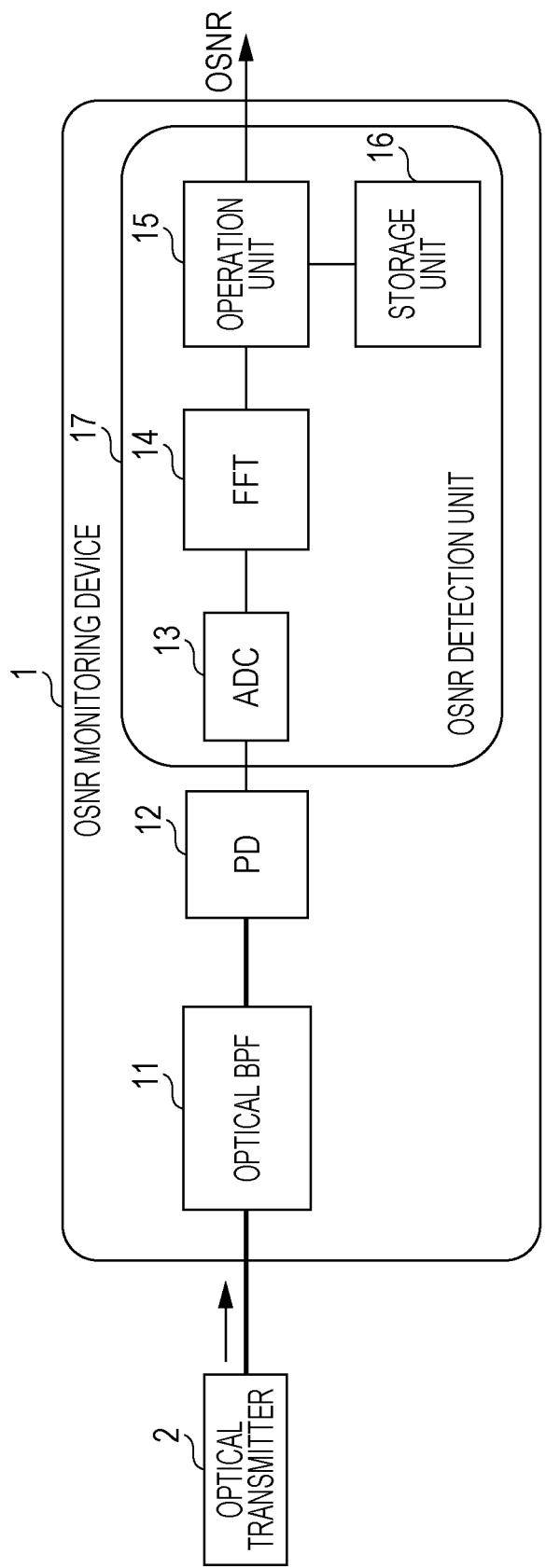
FIG. 1 is a block diagram illustrating an example of an OSNR monitoring device according to an embodiment.

FIG. 1 is a block diagram illustrating an example of an OSNR monitoring device according to an embodiment. An OSNR monitoring device 1 illustrated in FIG. 1 is an example of an optical signal quality monitoring device, and monitors the quality (for example, OSNRs) of optical signals transmitted from an optical transmitter 2.

The optical transmitter 2 superimposes a modulated signal on an optical signal (main signal light) of a wavelength for transmission. The modulated signal is, by way of example, a frequency-modulated (FM) signal. However, there is a calculus relationship between frequency modulation and phase modulation, and therefore a frequency shift keying (FSK) signal may be used as the modulated signal.

Figure 2:
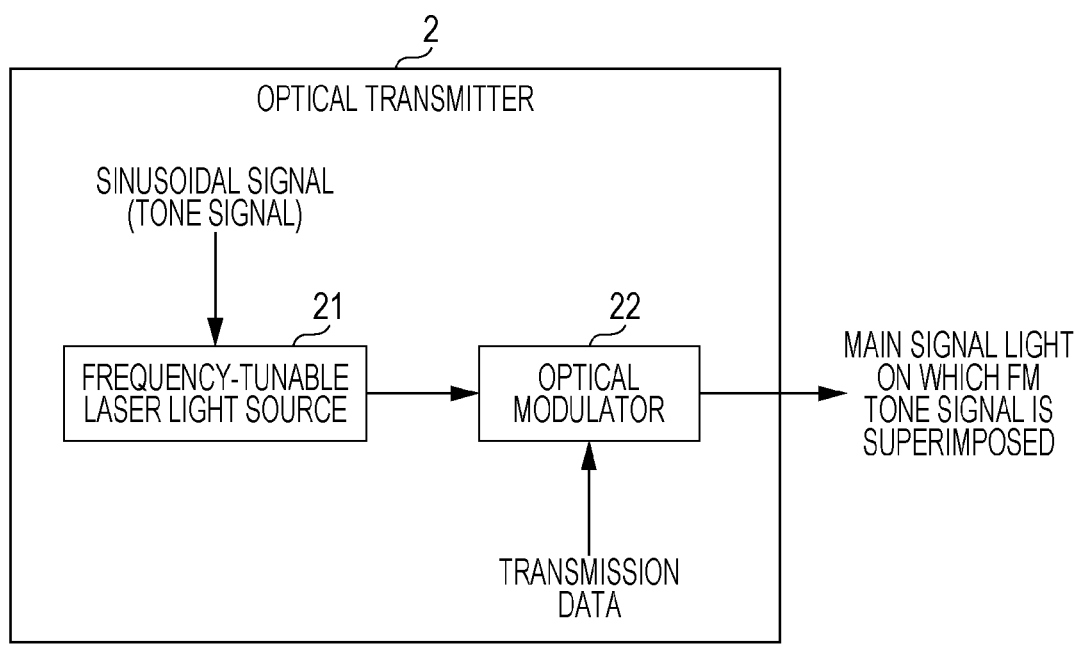
FIG. 2 is a block diagram illustrating an example of a configuration of an optical transmitter illustrated in FIG. 1.

In a superimposing approach, which is not particularly specified, for example, as illustrated in FIG. 2, a frequency-tunable laser light source 21 and an optical modulator 22 are used for the optical transmitter 2, and thereby enable an FM signal to be superimposed on main signal light.

A sinusoidal signal may be given to the frequency-tunable laser light source 21 in the optical transmitter 2 illustrated in FIG. 2. Then, the frequency-tunable laser light source 21 generates continuous light at an oscillation frequency in accordance with the sinusoidal signal.

The optical modulator 22 modulates continuous light generated by the frequency-tunable laser light source 21, using transmission data, to produce main signal light on which the sinusoidal signal is superimposed. The sinusoidal signal may be referred to as a tone signal, and is, by way of example, a repeat signal of "1010".

The frequency of the tone signal may be set to be sufficiently lower than the frequency of the main signal light, and may be set to several tens of kHz, as one non-limiting example. Note that the main signal light on which the tone signal (hereinafter also referred to as an "FM tone signal") is superimposed may be produced by digital signal processing, as described below with reference to FIG. 7.

The OSNR monitoring device 1 includes, by way of example, an optical band-pass filter (BPF) 11, an optical detector 12, an analog-to-digital converter (ADC) 13, a fast Fourier transformer (FFT) 14, an operation unit 15, and a storage unit 16. Main signal light on which an FM tone signal is superimposed as described above in the optical transmitter 2 is input to the optical BPF 11. Note that the ADC 13, the FFT 14, the operation unit 15, and the storage unit 16 together form an example of the OSNR detection unit 17.

Figure 3:
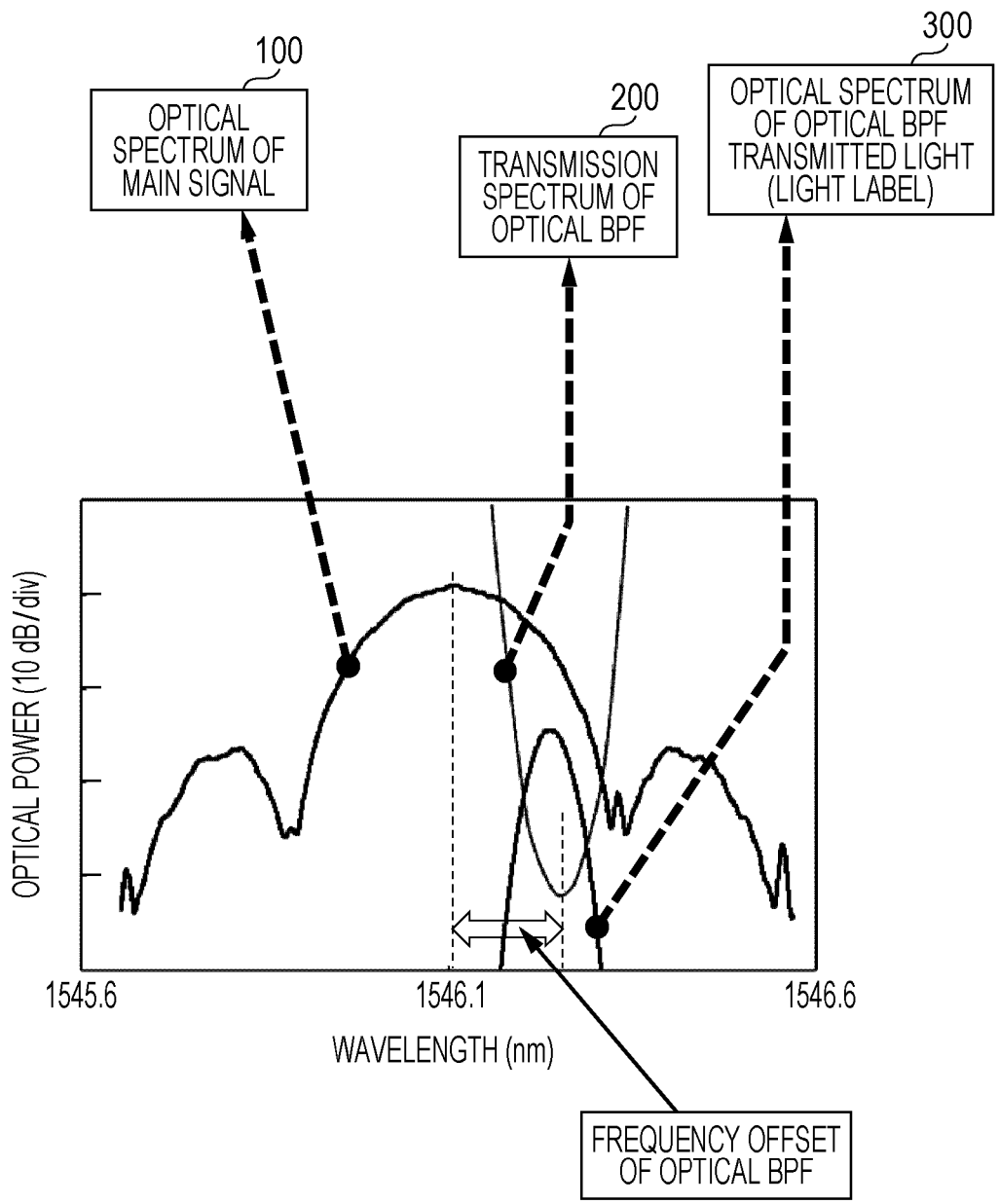
FIG. 3 is a graph illustrating an example of the spectrum of main signal light input to the optical BPF illustrated in FIG. 1, the transmission spectrum of an optical BPF, and the spectrum of transmitted light of the optical BPF.

FIG. 3 illustrates an example of the relationship among the spectrum of main signal light input to the optical BPF 11, the filter (transmission) characteristic of the optical BPF 11, and the spectrum of light that has been caused to pass through the optical BPF 11. In FIG. 3, reference numeral 100 denotes the spectrum of the main signal light input to the optical BPF 11, reference numeral 200 denotes the transmission spectrum of the optical BPF 11, and reference numeral 300 denotes the spectrum of transmitted light of the optical BPF 11.

As illustrated in FIG. 3, the optical BPF 11 has the center wavelength of the transmission spectrum 200 at a wavelength shifted (offset) on the low wavelength side from the center wavelength (for example, 1546.1 nm) of the input main signal light, and allows part of the spectrum 100 of the input main signal light to pass. Thus, light having a transmission light spectrum denoted by reference numeral 300 is input to the optical detector 12. Note that the transmission bandwidth of the optical BPF 11 may be set, by way of example, to a band narrower than half the signal light band of one wavelength.

Here, an FM tone signal is superimposed on main signal light input to the optical BPF 11; in other words, frequency modulation is performed on the main signal light. The center wavelength of the main signal light therefore varies in the frequency direction. In accordance with the variation, the power of light that has been caused to pass through the optical BPF 11 therefore also varies. Accordingly, light whose transmitted optical power temporally varies in this way is input to the optical detector 12.

Note that when the central wavelength of the optical BPF 11 is set to the center wavelength, or the vicinity thereof, of a spectrum of an input light signal, the variation in transmitted optical power is relatively small. Therefore, by setting the central wavelength of the optical BPF 11 to a wavelength shifted from the center wavelength of a spectrum of an input light signal, the detection sensitivity for an FM tone signal may be improved. Conversely, it is advantageous that the central wavelength of the optical BPF 11 is set to a wavelength at which the variation in transmitted optical power is relatively large.

The optical detector 12, by way of example, receives light that has been caused to pass through the optical BPF 11, and generates an electrical signal (for example, a current value or a voltage value into which that current value is converted) in accordance with the intensity of the received light. The optical detector 12 may be a photodetector (or photodiode) (PD), and may also be a ROSA including a PD and a transimpedance amplifier, for example. "ROSA" is the abbreviated name for a "receiver optical sub-assembly".

Here, since the power of light input from the optical BPF 11 to the optical detector 12 varies in accordance with a variation of the center wavelength of the main signal light as described above, an electrical signal (for example, a voltage value) output from the optical detector 12 also varies in accordance with that variation. In other words, the electrical signal output from the optical detector 12 contains a frequency component, that is, an FM tone signal component in accordance with that variation.

Accordingly, when an output electrical signal of the optical detector 12 is subjected to a Fourier transform to be converted (developed) into a frequency-domain signal as described below, the signal component and the noise component of the FM tone signal appear in the frequency domain. Note that either FFT or discrete Fourier transform (DFT) may be used for a Fourier transform.

The ADC 13 converts an output electrical signal (analog signal) of the optical detector 12 to a digital signal, and inputs the digital signal to the FFT 14.

Figure 4:
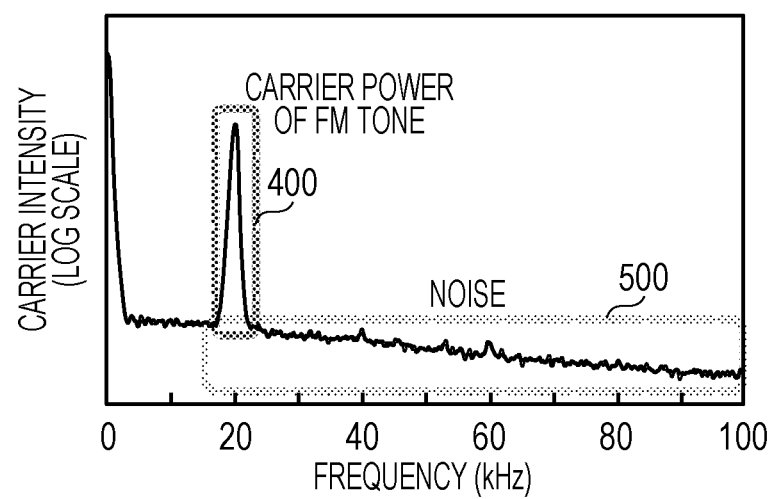
FIG. 4 is a graph illustrating an example of the intensity as a function of the frequency of a signal obtained by an FFT illustrated in FIG. 1.

The FFT 14 performs FFT on a digital signal input from the ADC 13. Thus, the digital signal input from the ADC 13 is converted from the time-domain signal to the frequency-domain signal. That is, the temporal power variation in accordance with the FM tone signal in the optical detector 12 is developed in the frequency domain. For example, as illustrated in FIG. 4, the FM tone signal component (refer to reference numeral 400) and the noise component (refer to reference numeral 500) appear in the frequency domain.

From the result of FFT processing performed by the FFT 14, the operation unit 15 determines a carrier-to-noise ratio (CNR), which is a power (intensity) ratio between the FM tone signal component and the noise component, by the following formula (3. 1).

$$CNR = \text{(carrier intensity of FM tone signal component)/(noise intensity)} \quad (3.1)$$

Note that a filter (for example, BPF) that cancels the noise component included in a result of FFT processing performed by the FFT 14 may be provided between the FFT 14 and the operation unit 15.

The storage unit 16 stores data (or may be referred to as a "parameter") that indicates the relationship between the CNR and the OSNR. A memory, such as a random-access memory (RAM) or a read-only memory (ROM), may be used, by way of example, as the storage unit 16. Note that the relationship between the CNR and the OSNR has a tendency that the higher the CNR is, the higher the OSNR is, as described below with reference to FIG. 5. Data indicating the relationship between the CNR and the OSNR may be stored as table-format data, by way of example and not limitation, in the storage unit 16. That table-format data is referred to as a "CNR versus OSNR table" in some cases.

Referring to the CNR versus OSNR table stored in the storage unit 16, the operation unit 15 acquires an OSNR for a CNR, and outputs the OSNR as a monitor result. The monitor result may be referred to as an OSNR detection result. Note that the operation unit 15 may determine an OSNR by performing an operation using a mathematical formula or an approximate expression equivalent to the content of the CNR versus OSNR table. Nevertheless, using the CNR versus OSNR table is more effective than performing an operation in terms of speeding up of acquisition of a monitor result.

In this way, with the OSNR monitoring device 1 described above, since an OSNR is determined based on a CNR of an FM tone signal superimposed on main signal light, amplitude modulation of main signal light as in U.S. Patent Application Publication No. 2012/0106951 is unnecessary. Accordingly, a penalty does not occur in the main signal light.

Additionally, even if an input light signal to the OSNR monitoring device 1 is a wavelength-division multiplexed signal or a polarization-division multiplexed signal, even if that input light signal is affected by wavelength dispersion, polarization-mode dispersion, or the like, or even if spectrum narrowing has arisen, the aforementioned OSNR monitor approach is unlikely to be affected by such an event. Accordingly, it is easy to secure fixed OSNR monitor accuracy.

Furthermore, an OSNR may be determined by simple processing in which an FM tone signal is acquired in the situation where the central wavelength of the optical BPF 11 is offset from the center wavelength of a main signal light spectrum. It is therefore easy to achieve accuracy improvement, speeding up, and stabilization in OSNR monitoring.

Additionally, the optical BPF 11 and the optical detector (PD or ROSA) 12 are exemplary general-purpose optical components for use in an optical channel monitor (OCM) of an optical transmission device. Cost reduction of the OSNR monitoring device 1 may therefore be achieved. Additionally, it is possible to use (share) the optical BPF 11 and the optical detector 12 so as to also serve as optical components for use in an OCM of an optical transmission device. Addition of optical components for OSNR monitoring is therefore made unnecessary or minimized, so that the OSNR monitoring device 1 may be applied to the optical transmission device at low cost.

Additionally, it is possible to implement the storage unit 16 and the operation unit 15 that determines the CNR of an FM tone signal by a memory and a processor having an operation capability, such as a digital signal processor (DSP) or a central processing unit (CPU). The storage unit 16 and the operation unit 15 may therefore also be used (shared) as a memory and a processor included in an optical transmission device. Accordingly, without addition of hardware for OSNR monitoring, the OSNR monitoring device 1 may be applied to the optical transmission device at low cost.

Note that examples of the optical transmission device may include an optical transmission station, an optical receiving station, an optical relay station, an optical add/drop station, and so forth. The "station" may also be referred to as a "node". As an example of an optical add/drop node, a ROADM node will be described below with reference to FIG. 10. "ROADM" is the abbreviated name for a "reconfigurable optical add/drop multiplexer".

(Adjustment of Frequency Deviation of FM Tone Signal)

Figure 5:
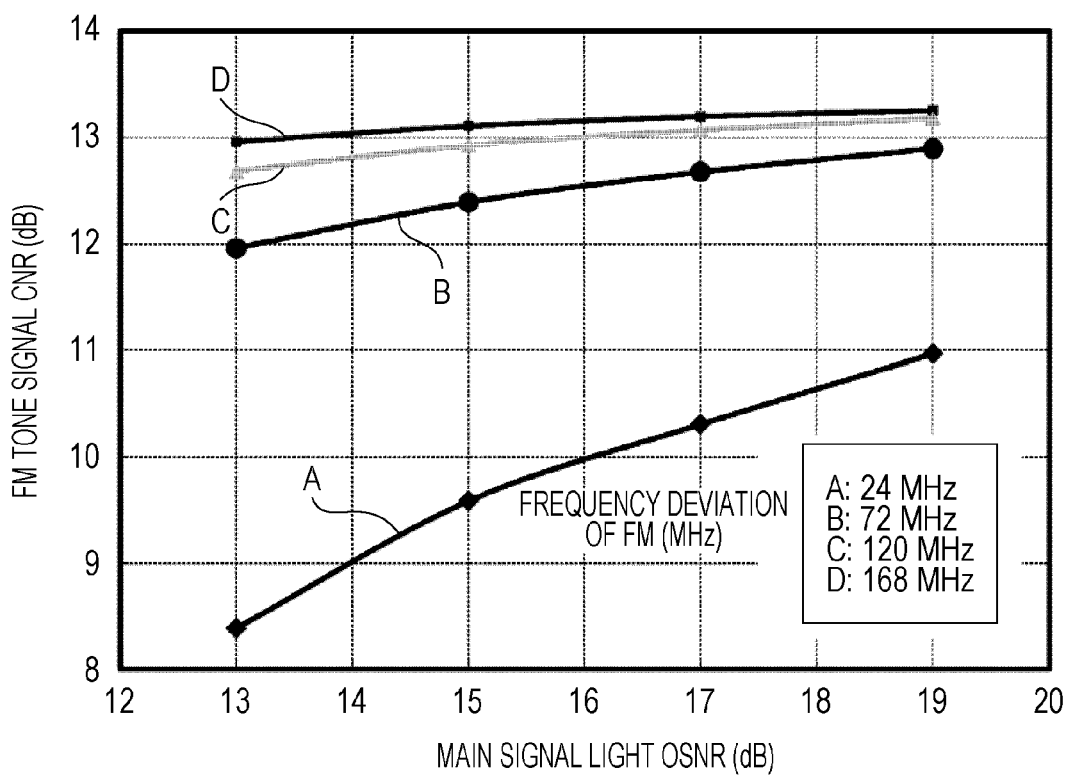
FIG. 5 is a graph illustrating an example of characteristics of the CNRs of FM tone signals as functions of the OSNR of main signal light.

As illustrated in FIG. 5, the CNRs of an FM tone signal differ even for the same OSNR, depending on the frequency deviation of the FM tone signal. Note that the frequency deviation represents the width of a frequency change in frequency modulation. In FIG. 5, the characteristics denoted by A to D are OSNR versus CNR characteristics in cases where the frequency deviations of an FM tone signal are 24 MHz, 72 MHz, 120 MHz, and 168 MHz, respectively.

As already described, all the characteristics A to D have a tendency (relationship) that the higher the CNR is, the higher the OSNR is. As is seen when the characteristics are compared, there is a tendency that, even for the same OSNR, the larger the frequency deviation of the FM tone signal is, the higher the CNR is.

In contrast, as is seen when the characteristic A is compared with the characteristics B to D, changes in OSNR relative to changes in CNR are large, although the overall CNR is low, in the characteristic A compared with the other characteristics B to D where frequency deviations are relatively large.

In other words, there is a tendency that the smaller the frequency deviation of an FM tone signal is, the larger the changes in OSNR relative to changes in CNR are. That is, as the frequency deviation of an FM tone signal is smaller, the identification sensitivity of the OSNR is higher although the overall CNR is lower.

Accordingly, the frequency deviation of an FM tone signal superimposed on main signal light in the optical transmitter 2 is set so as to obtain the characteristic A with which the identification sensitivity for the OSNR is relatively high. By way of example and not limitation, the frequency deviation of the FM tone signal is set so that the CNR of the FM tone signal falls within a range from 8 dB to 12 dB.

Note that, utilizing the fact that the identification sensitivity for the OSNR changes when the frequency deviation changes as described above, the frequency deviations may be made different in the optical transmitter 2 in accordance with the types and the importance levels of information to be transmitted when that information is superimposed as frequency-modulated signals on main signal light.

For example, frequency modulation in which the frequency deviation is relatively large (the CNR obtained being relatively high) is applied to first information, and frequency modulation in which the frequency deviation is relatively small (the identification sensitivity for the OSNR being relatively high) is applied to second information.

By way of example and not limitation, the first information is path identification information (path ID) and information on the optical transmitter 2 (hereinafter referred to as "transmitter information" in some cases), and the second information is a repeat signal (tone signal) of "1010" used for OSNR monitoring. Note that the path ID is an example of information identifying a plurality of optical paths if the same wavelength is assigned to the plurality of optical paths. The path ID may be referred to as path trace information (or signal), and may be thought as information included in the path trace information (or signal).

Figure 6:
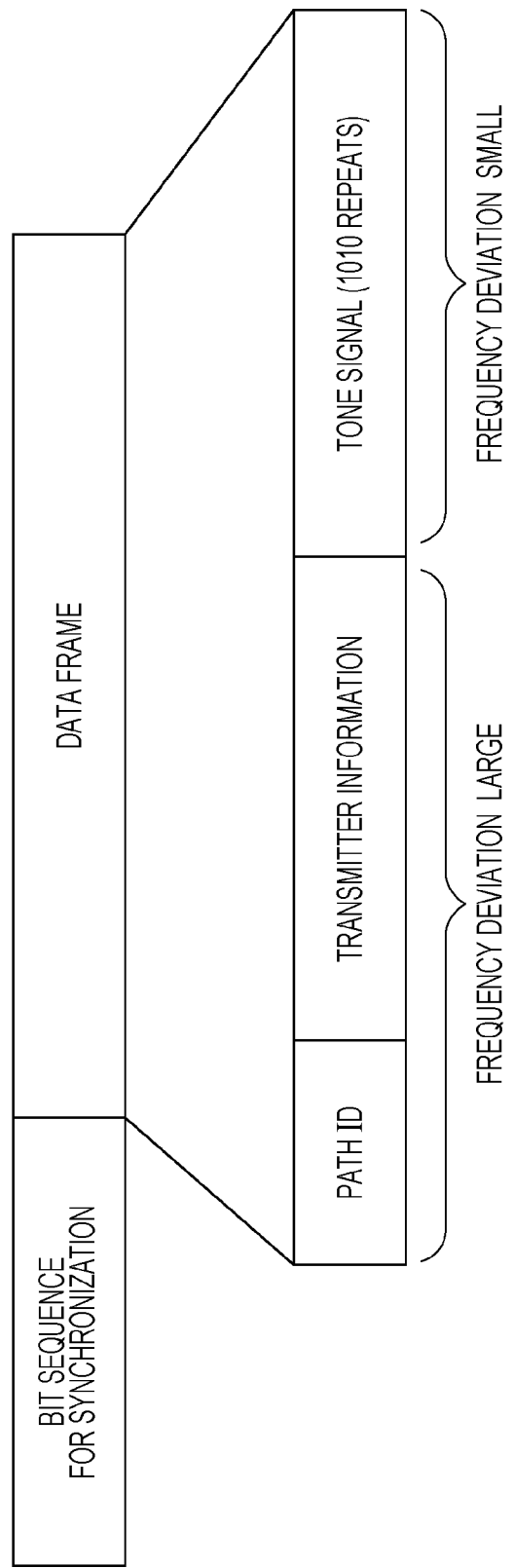
FIG. 6 is an illustration for explaining an example in which the frequency deviation of an FM tone signal is changed.

FIG. 6 illustrates an example of a transmission frame generated by the optical transmitter 2. As illustrated in FIG. 6, the optical transmitter 2 generates a transmission frame including a given bit sequence for synchronization (sync bit sequence), and a data frame (which may be referred to as a "payload").

An FSK signal, for example, which is a modulated signal including a path ID, transmitter information, and a tone signal, is superimposed, by way of example, on the data frame. Accordingly, the data frame may be referred to as an "FSK data frame".

Among the path ID, the transmitter information, and the tone signal, the tone signal is an example of a first modulated signal that is frequency modulated with a first modulation deviation. In contrast to this, the path ID and the transmitter information are examples of a second modulated signal that is frequency modulated with a second frequency deviation.

The first frequency deviation is smaller than the second frequency deviation. In other words, frequency modulation in which the frequency deviation is relatively large is applied to the path ID and the transmitter information, whereas frequency modulation in which the frequency deviation is relatively small is applied to the tone signal.

This makes it possible, on the receiving side of the transmission frame, to cause the receiving OSNR of the path ID and the transmitter information to be higher than the receiving OSNR of the tone signal, and to cause the identification sensitivity for the receiving OSNR of the tone signal to be higher than the identification sensitivity for the receiving OSNR of the path ID and the transmitter information.

In this way, adjusting the frequency deviation of an FM signal enables the value of the CNR resulting from a difference in OSNR to be optimized. For example, relatively decreasing the frequency deviation of an FM tone signal increases the change in OSNR of the FM tone signal resulting from a change in CNR. This facilitates identification of an OSNR.

Note that, in this example, the data using frequency deviation as a parameter for the relationship between the CNR of an FM signal and the OSNR, which is illustrated in FIG. 5, may be acquired in advance and stored as table-format data or the like in the storage unit 16. The table-format data is referred to as a "frequency-deviation dependence table" in some cases. Referring to the "frequency-deviation dependence table" stored in the storage unit 16, the operation unit 15 determines an OSNR in accordance with a frequency deviation. This may result in speeding up of acquisition of an OSNR. Note that although two types of frequency deviations are given in the aforementioned example, three or more types of frequency deviations may be given.

Figure 7:
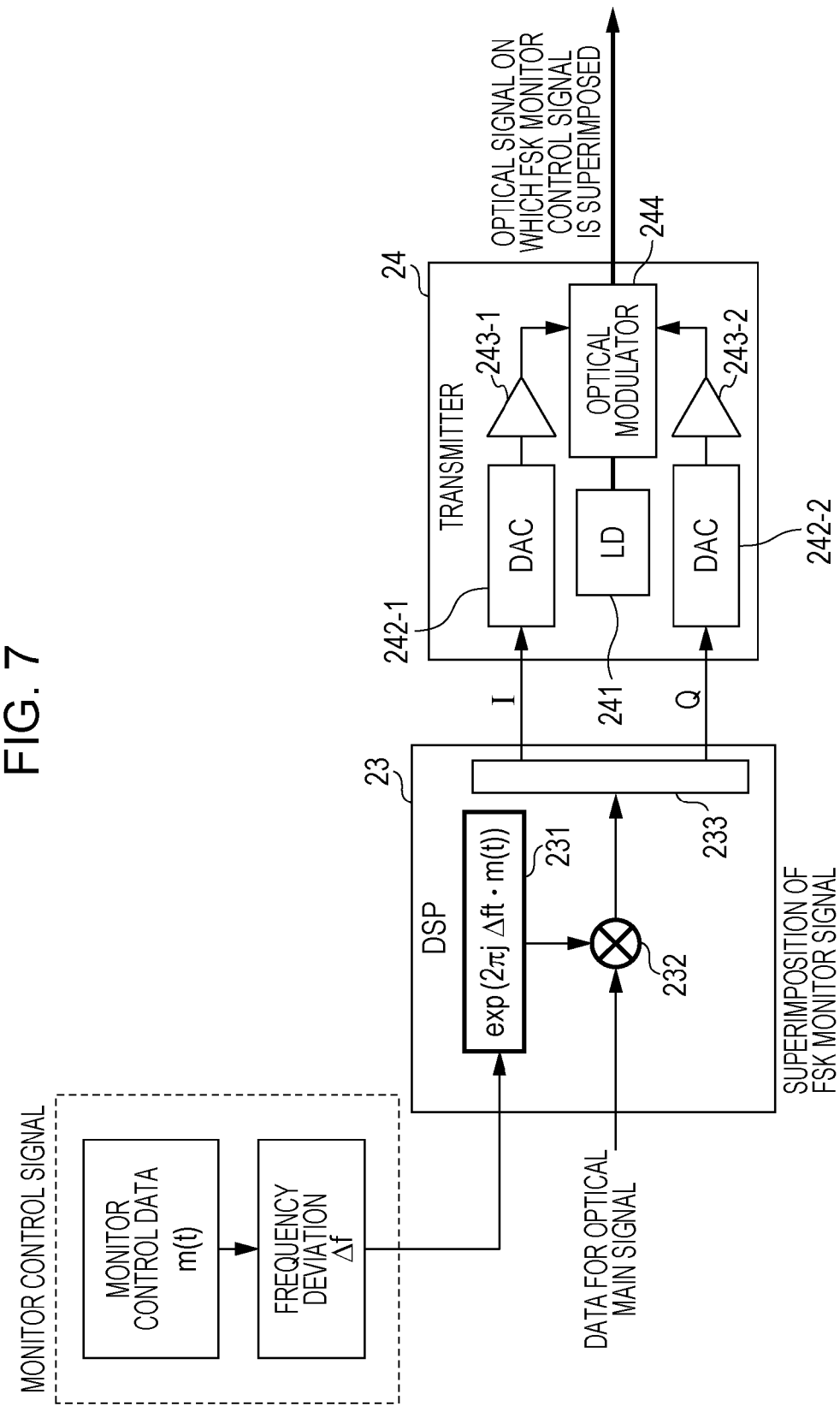
FIG. 7 is a block diagram illustrating an example of a configuration of an optical transmitter that enables a change in the frequency deviation of the FM tone signal illustrated in FIG. 6.

FIG. 7 illustrates an example of a configuration of the optical transmitter 2 capable of changing a frequency deviation as described above. The optical transmitter 2 illustrated in FIG. 7 implements frequency modulation by digital signal processing by way of example. For this reason, the optical transmitter 2 includes a DSP 23 and a transmitter 24.

The DSP 23 functionally includes a rotation operation unit 231, a multiplier 232, and a mapper 233. In contrast, the transmitter 24 includes a laser diode (LD) 241, which is an example of a light source, digital-to-analog converters (DACs) 242-1 and 242-2, amplifiers 243-1 and 243-2, and an optical modulator 244.

In the DSP 23, the rotation operation unit 231 performs a phase rotation operation expressed by exp ($2\pi j \Delta f t \cdot m(t)$) where a monitor control data row superimposed on main signal light is represented by m(t), and a frequency deviation is represented by $\Delta f$. Note that the monitor control data row includes, by way of example, a path ID, transmitter information, and a tone signal.

The multiplier 232 multiplies the monitor control data row by an operation result obtained by the rotation operation unit 23.

The mapper 233 maps the data row output from the multiplier 232 onto an I component data row and a Q component data row represented in a complex plane (I-Q plane). The I component data row is input to one DAC 242-1 of the transmitter 24, and the Q component data row is input to the other DAC 242-2 of the transmitter 24.

The DACs 242-1 and 242-2 convert the I component data row and the Q component data row input from the DSP 23 to analog signals, respectively.

The amplifiers 243-1 and 243-2 amplify the I component analog signal and the Q component analog signal input from the corresponding DACs 242-1 and 242-2, respectively, and input them to the optical modulator 244.

The optical modulator 244 modulates continuous light output from the LD 241, using the I component analog signal and the Q component analog signal, to produce transmission modulated signal light. This enables transmission modulated signal light in which frequency-modulated monitor control data is superimposed on a main signal to be obtained.

Here, the frequency deviation $\Delta f$ used for a phase rotation operation in the rotation operation unit 231 is changed so that the frequency deviation $\Delta f$ is larger in the tone signal than in the path ID and the transmitter information, as illustrated in FIG. 6. This enables the OSNR of the path ID and the transmitter information to be relatively high, and enables the OSNR identification sensitivity of the tone signal to be increased. Accordingly, improvement in the receiving quality of the path ID and the transmitter information may be achieved together with improvement in the monitoring accuracy of the OSNR.

(Setting of Filter Offset Amount)

Figure 8:
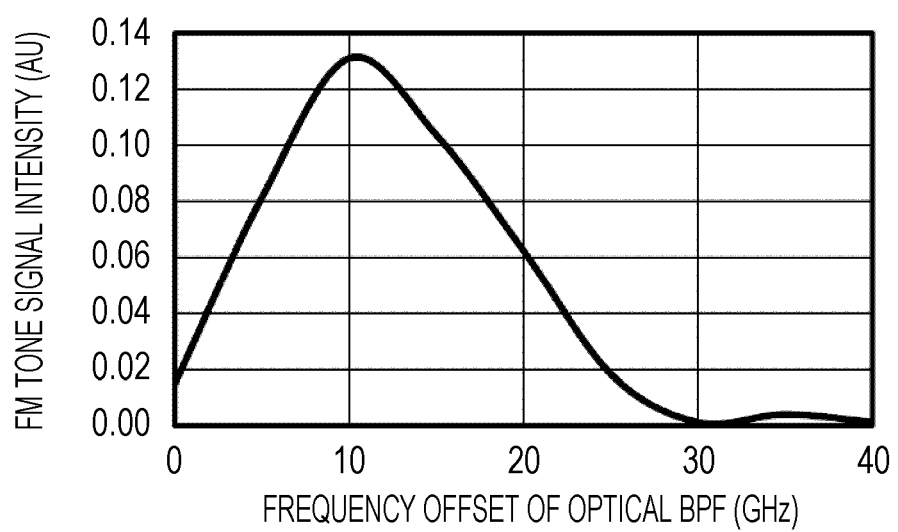
FIG. 8 is a graph illustrating an example of a characteristic of the FM tone signal intensity as a function of the frequency offset of the optical BPF illustrated in FIG. 1.

The intensity of an FM tone signal changes with the frequency offset amount of the optical BPF 11 (refer to FIG. 3). For example, as illustrated in FIG. 8, the intensity of the FM tone signal has a characteristic that the intensity changes from an increase to a decrease in accordance with the increase in the frequency offset amount of the optical BPF 11. In other words, the intensity of an FM tone signal has a maximum value (peak value) for a change in frequency offset amount.

Accordingly, a tunable filter is used as the optical BPF 11, the central wavelength of that tunable filter is swept, and a frequency at which the intensity of an FM tone signal is maximized is determined. Then, the central wavelength of the optical BPF 11 is set to a wavelength corresponding to the determined frequency. Note that the sweeping and the setting may be performed, by way of example, by the operation unit 15, or may be performed by a separate control unit that cooperates with the operation unit 15.

This enables the frequency offset amount of the optical BPF 11 to be defined based on the frequency at which the intensity of an FM tone signal is maximized, which, in turn, makes frequency setting with high precision for the optical BF 11 unnecessary.

Note that the central frequency of the optical BPF 11 may be acquired in a state of being set to a frequency (peak frequency) at which the intensity of an FM tone signal is maximized, and may also be acquired in a state of being set to a frequency shifted from that peak frequency by a given amount.

(In Case of Multicarrier Transmission)

Figure 9:
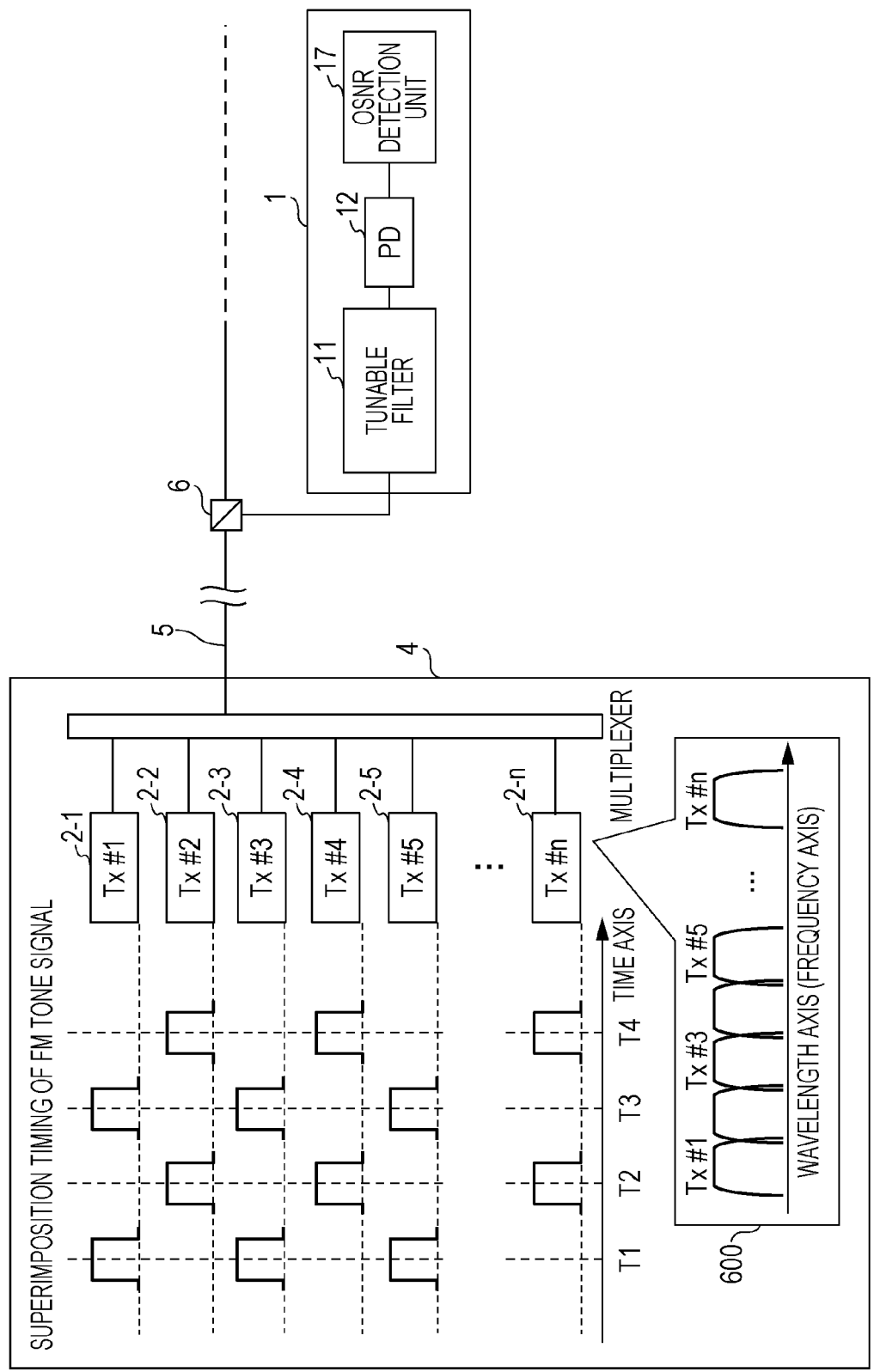
FIG. 9 is an illustration for explaining timings for superimposing FM tone signals for optical signals of a plurality of wavelengths in an optical transmission station.

As illustrated in FIG. 9, an optical transmission station 4, in which a plurality of multicarrier optical transmitters 2-1 to 2-n (n being an integer of two or more) are included, multiplexes output light of the optical transmitters 2-1 to 2-n by using a multiplexer 3 and transmits wavelength-multiplexed light (WDM light) to an optical transmission path 5, in some cases.

In such a case, as illustrated in a frame 600 in FIG. 9, the intervals between adjacent subcarriers (channels) are very narrow in multicarrier transmission referred to as a superchannel. A crosstalk is therefore likely to occur between subcarriers. For this reason, if FM tone signals are superimposed on all the subcarriers, there are some cases where it is difficult to detect an OSNR.

Accordingly, timings for superimposing FM tone signals are set not to overlap for adjacent subcarriers. By way of example and not limitation, as illustrated in FIG. 9, timings for superimposing FM tone signals are displaced between even-numbered channels and odd-numbered channels.

For example, at a point in time T1 (or T3), FM tone signals are superimposed on main signal light in the optical transmitters 2-1, 2-3, 2-5, . . . corresponding to the odd-numbered channels, and no FM tone signals are superimposed on main signal light in the optical transmitters 2-2, 2-4, 2-6, . . . corresponding to the even-numbered channels.

At a subsequent point in time T2 (or T4), no FM tone signals are superimposed on main signal light in the optical transmitters 2-1, 2-3, 2-5, . . . corresponding to the odd-numbered channels, and FM tone signals are superimposed on main signal light in the optical transmitters 2-2, 2-4, 2-6, . . . corresponding to the even-numbered channels.

Thus, at one point in time T1, T2, T3, or T4, FM tone signals are superimposed only on odd-numbered channels, or even-numbered channels, of adjacent channels. Note that such control of timings for superimposing FM tone signals may be performed by a controller (not illustrated) included in the transmission station 4.

In the OSNR monitoring device 1, a channel on which an FM tone signal is superimposed is selected by the optical BPF 11, which is a tunable filter, so that the CNR of an FM tone signal is determined and then the OSNR is determined by the determined CNR, as already described. Note that, in FIG. 9, reference numeral 6 denotes an optical branching coupler that causes part of WDM light transmitted through the optical transmission path 5 to branch off therefrom and inputs the part to the OSNR monitoring device 1.

In this way, the channel on which an FM tone signal is superimposed is selected, and thus the CNR may be determined. Measurement of OSNRs is therefore made easy for a group of channel signals close to one another. Accordingly, measurement of OSNRs of the group of channel signals close to one another is enabled without providing a penalty to the main signal light.

Note that although the aforementioned example is an example in which FM tone signals are alternately superimposed for even-numbered channels and for odd-numbered channels, FM tone signals may be superimposed orderly (in a time-division manner) for channels.

(Example of Application to ROADM Node)

Next, an example in which the OSNR monitoring device 1 described above is applied to a ROADM node, which is an example of an optical transmission device, will be described.

Figure 10:
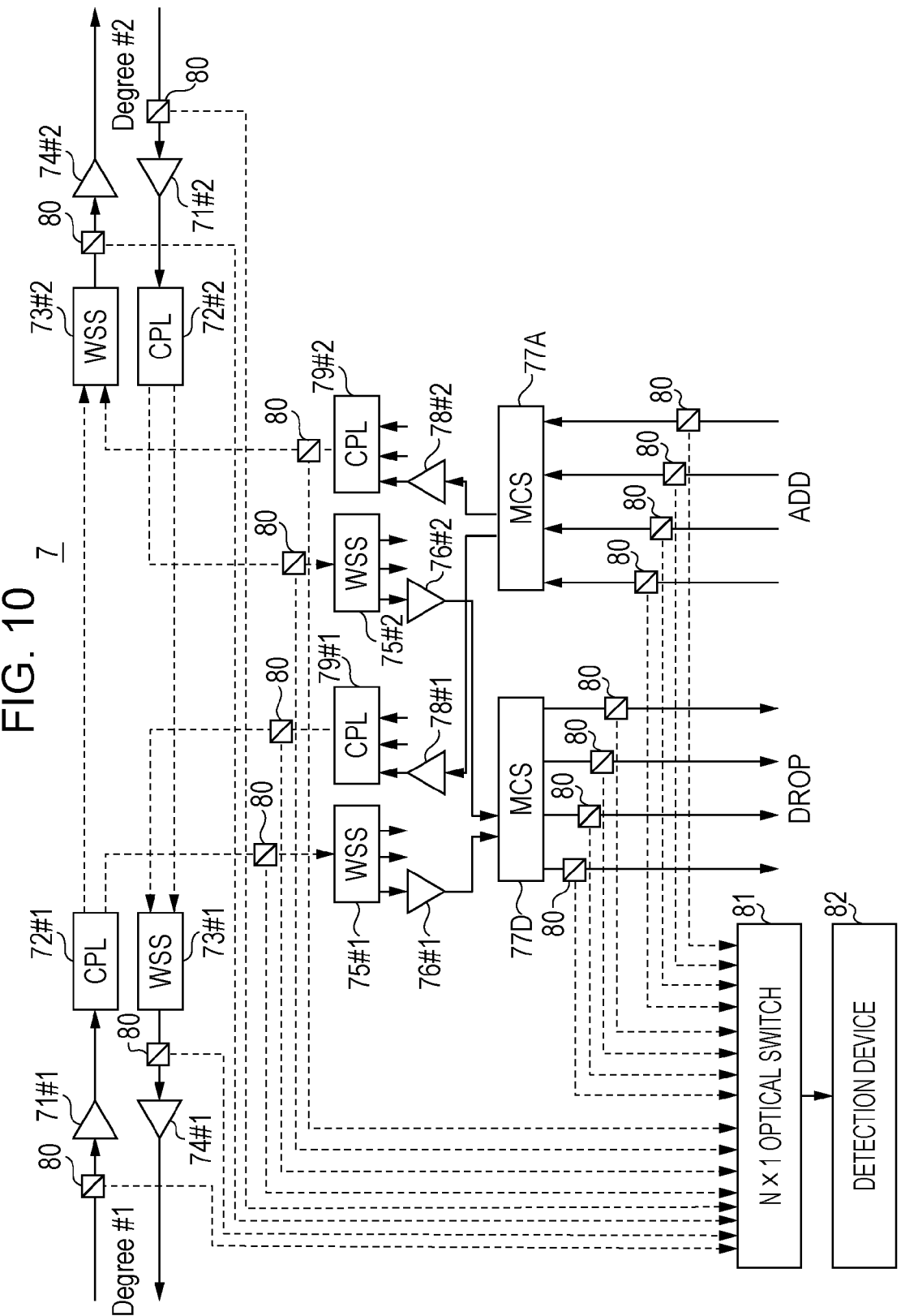
FIG. 10 is a block diagram illustrating an example of a configuration of a ROADM node to which the OSNR monitor device illustrated in FIG. 1 is applied.

FIG. 10 is a block diagram illustrating an example of a configuration of a ROADM node 7. The ROADM node 7 illustrated in FIG. 10 includes, by way of example, two lines (for example, a degree #1 and a degree #2). The degree #1 includes a set of an incoming line and an outgoing line. Similarly, the degree #2 includes a set of incoming line and an outgoing line.

An optical amplifier 71#1 amplifies a WDM optical signal input from the degree #1, and outputs the signal to an optical coupler (CPL) 72#1.

An optical amplifier 71#2 amplifies a WDM optical signal input from the degree #2, and outputs the signal to an optical coupler (CPL) 72#2.

An optical amplifier 74#1 amplifies an optical signal output from a wavelength-selective switch (WSS) 73#1, and outputs the signal to the outgoing line of the degree #1.

An optical amplifier 74#2 amplifies an optical signal output from a WSS 73#2, and outputs the signal to the outgoing line of the degree #2.

The optical coupler 72#1 divides a WDM optical signal input from the optical amplifier 71#1 of the degree #1 into branches, and leads the branches to the WSS 73#2 (through connection) of the degree #2 and to a dropping WSS 75#1.

Similarly, the optical coupler 72#2 divides a WDM optical signal input from the optical amplifier 71#2 of the degree #2 into branches, and leads the branches to the WSS 73#1 (through connection) of the degree #1 and to a dropping WSS 75#2.

The dropping WSS 75#1 selects optical signals of one or a plurality of wavelengths (drop wavelengths) specified by a wavelength pass control unit, which is not illustrated, from a WDM optical signal led from the optical coupler 72#1 of the degree #1. Note that the wavelength pass control unit may be included as one function of a control block 900 described below with reference to FIG. 11.

Similarly, the dropping WSS 75#2 for selects optical signals of one or a plurality of wavelengths (drop wavelengths) specified by the wavelength pass control unit from a WDM optical signal led from the optical coupler 72#2 of the degree #2.

The optical signals of drop wavelengths selected in the WSSs 75#1 and 75#2 are amplified by the corresponding optical amplifiers 76#1 and 76#2, and are input to a dropping multicast switch (MCS) 77D. Note that the wavelengths selected by the WSSs 75#1 and 75#2 may be different from each other, may be the same, or may partially overlap. Additionally, there are some cases where the optical amplifier 76#1 and 76#2 are unnecessary.

The MCS 77D multicasts the optical signals of drop wavelengths, which have been selected by the WSSs 75#1 and 75#2 for the degrees #1 and #2, respectively, to any of optical detectors, which are not illustrated.

In contrast, an optical signal of a wavelength for addition (add wavelength) to WDM light of the degree #1 or #2 is input from any of optical transmitters, which are not illustrated, to an adding MCS 77A.

The MCS 77A multicasts the optical signal of the add wavelength to optical amplifiers 78#1 and 78#2 corresponding to the respective degrees #1 and #2.

The optical amplifiers 78#1 and 78#2 amplify the optical signals of the add wavelength input from the MCS 77A, and lead the signals to optical couplers (CPLs) 79#1 and 79#2 corresponding to the respective degrees #1 and #2.

The optical couplers 79#1 and 79#2 multiplex the optical signals of the add wavelength amplified by the corresponding amplifiers 78#1 and 78#2, and lead the signals to the WSSs 73#1 and 73#2 of the corresponding degrees #1 and #2, respectively.

The WDM optical signal led from the optical coupler 72#2 of the degree #2 and the optical signal of the add wavelength led from the adding optical coupler 79#1 are input to the WSS 73#1 of the degree #1.

Under control of the wavelength pass control unit, the WSS 73#1 selects one or a plurality of arbitrary wavelengths to be caused to "pass (through)" to the outgoing line of the degree #1, from optical signals led from the optical coupler 72#2 of the degree #2. Additionally, under control of the wavelength pass control unit, the WSS 73#1 selects one or a plurality of arbitrary wavelengths for "adding" to a WDM optical signal to be output to the outgoing line of the degree

1, from optical signals led from the adding optical coupler 79#1. Thus, the WDM optical signal to be output to the outgoing line of the degree #1 is generated.

A WDM optical signal led from the optical coupler 72#1 of the degree #1 and an optical signal of an add wavelength led from the adding optical coupler 79#2 are input to the WSS 73#2 of the degree #2.

Under control of the wavelength pass control unit, the WSS 73#2 selects one or a plurality of arbitrary wavelengths to be caused to "pass (through)" to the outgoing line of the degree #2, from optical signals led from the optical couplers 72#1 of the degree #1. Additionally, under control of the wavelength pass control unit, the WSS 73#2 selects one or a plurality of arbitrary wavelengths for "adding" to a WDM optical signal to be output to the outgoing line of the degree #2, from optical signals led from the adding optical coupler 79#2. Thus, the WDM optical signal to be output to the outgoing line of the degree #2 is generated.

In the ROADM node 7 having such a configuration, an optical coupler 80 is provided on any of routes along which optical signals to be monitored propagate. For example, when a WDM optical signal input from the degree #1 (or #2) to the optical amplifier 71#1 (or 71#2) is to be monitored, the optical coupler 80 is provided before the optical amplifier 71#1 (or 71#2). Additionally, when a WDM optical signal output to the degree #1 (or #2) is to be monitored, the optical coupler 80 is provided, for example, between the WSS 73#1 and the optical amplifier 74#1 (or between the WSS 73#2 and the optical amplifier 74#2).

Furthermore, when an optical signal dropped to the WSS 75#1 (or 75#2) is to be monitored, the optical coupler 80 is provided on the route from the optical coupler 72#1 to the WSS 75#1 (or from the optical coupler 72#2 to the WSS 75#2). Additionally, when an optical signal of a drop wavelength is to be monitored, for example, the optical coupler 80 is provided, for example, on any of output routes of the MCS 77D.

Furthermore, when an optical signal of an add wavelength is to be monitored, for example, the optical coupler 80 is provided, for example, on any of input routes to the MCS 77A. Additionally, when an optical signal including an add wavelength input to the WSS 73#1 (or 73#2) is to be monitored, the optical coupler 80 is provided, for example, on the route from the optical coupler 79#1 to the WSS 73#1 (or from the optical coupler 79#2 to the WSS 73#2).

The optical signals (monitor light) branched in the optical couplers 80 are input to an N×1 optical switch 81 as indicated by dotted line arrows in FIG. 10. Note that N is an integer of two or more, and may equal to the number of the optical couplers 80 or be larger than the number of optical couplers 80. In accordance with control of the control block 900 described below with reference to FIG. 11, the N×1 optical switch 81 selectively inputs any of monitor light input from the optical couplers 80 to a detection device 82. Note that the N×1 optical switch 81 is simply referred to as the optical switch 81 in some cases.

The detection device 82 performs, by way of example, any of the OCM, optical path detection, and OSNR detection, based on monitor light input from the optical switch 81. The detection device 82 may be referred to as an OCM/optical path/OSNR detection multifunction device. However, either or both of the OCM and the optical path detection may be made unnecessary. In other words, the detection device 82 may have functions of the OCM and the OSNR detection or the optical path detection and the OSNR detection, or may be a device specialized for the OSNR detection.

Figure 11:
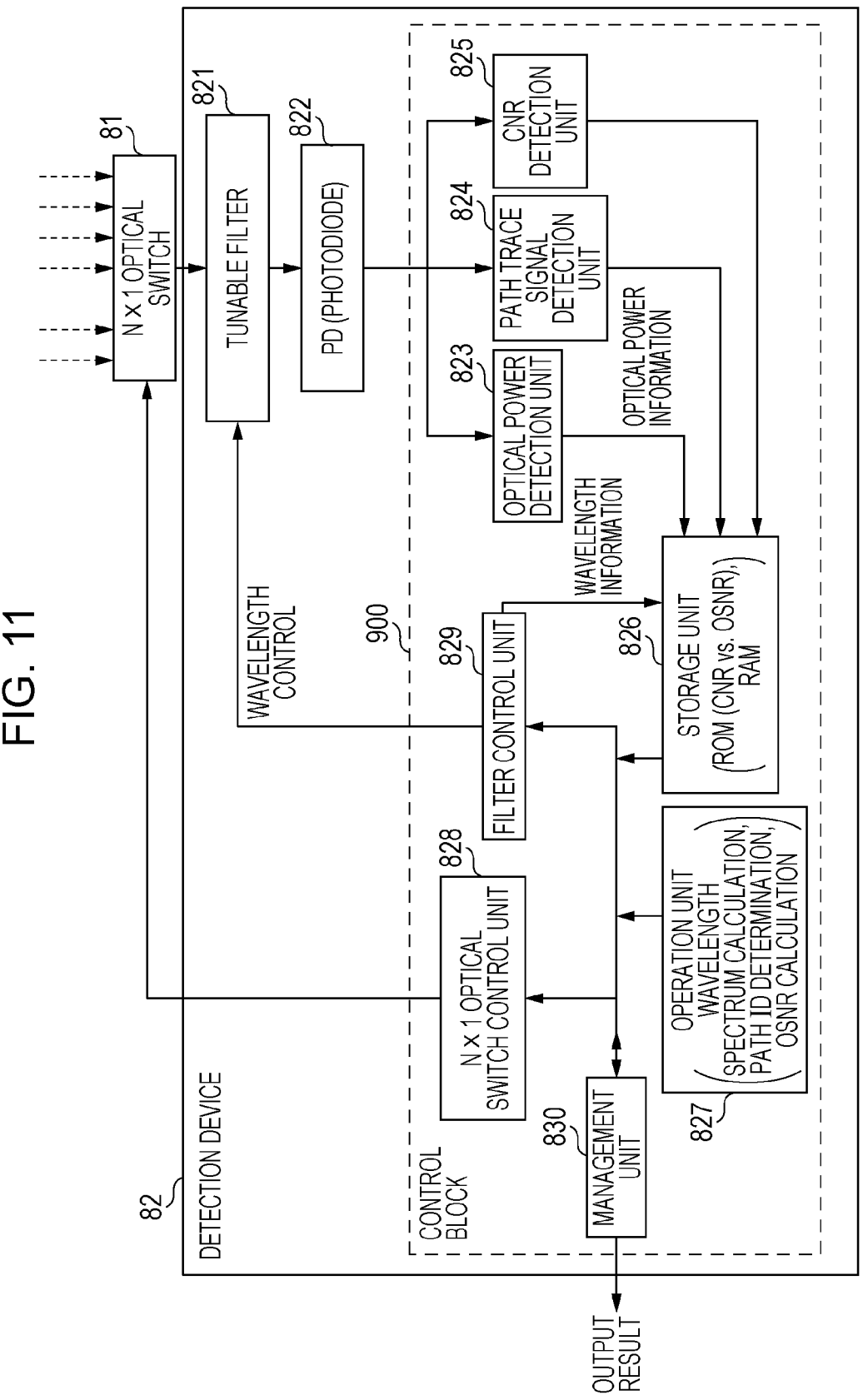
FIG. 11 is a block diagram illustrating an example of a configuration of a detection device illustrated in FIG. 10.

The detection device 82 includes a tunable filter 821, a photodiode (PD) 822, and a control block 900, for example, as illustrated in FIG. 11. The control block 900 includes, by way of example, an optical power detection unit 823, a path trace signal detection unit 824, and a CNR detection unit 825. The control block 900 also includes a storage unit 826, an operation unit 827, an N×1 optical-switch control unit 828, a filter control unit 829, and a management unit 830.

The tunable filter 821 is, by way of example, an optical BPF, and filters monitor light input from the optical switch 81 to cause the light to pass to the PD 822. When the central wavelength is controlled in accordance with control from the filter control unit 829, the tunable filter 821 may change the wavelength of light caused to pass to the PD 822. Note that the tunable filter 821 corresponds to the optical BPF 11 illustrated in FIG. 1 and FIG. 9.

The PD 822 is an example of the foregoing optical detector 12. The PD 822 receives transmitted light of the tunable filter 821, and outputs an electrical signal (for example, voltage value) in accordance with the power of the received light to the optical power detection unit 823, the path trace signal detection unit 824, and the CNR detection unit 825.

The optical power detection unit 823 detects the voltage value of an electrical signal input from the PD 822, and thus acquires power information on the monitor light received by the PD 822. The acquired light power information is stored in the storage unit 826.

The path trace signal detection unit 824 detects a path trace signal including the foregoing path ID, based on the voltage value of an electrical signal input from the PD 822. The detection result is stored in the storage unit 826.

Figure 12:
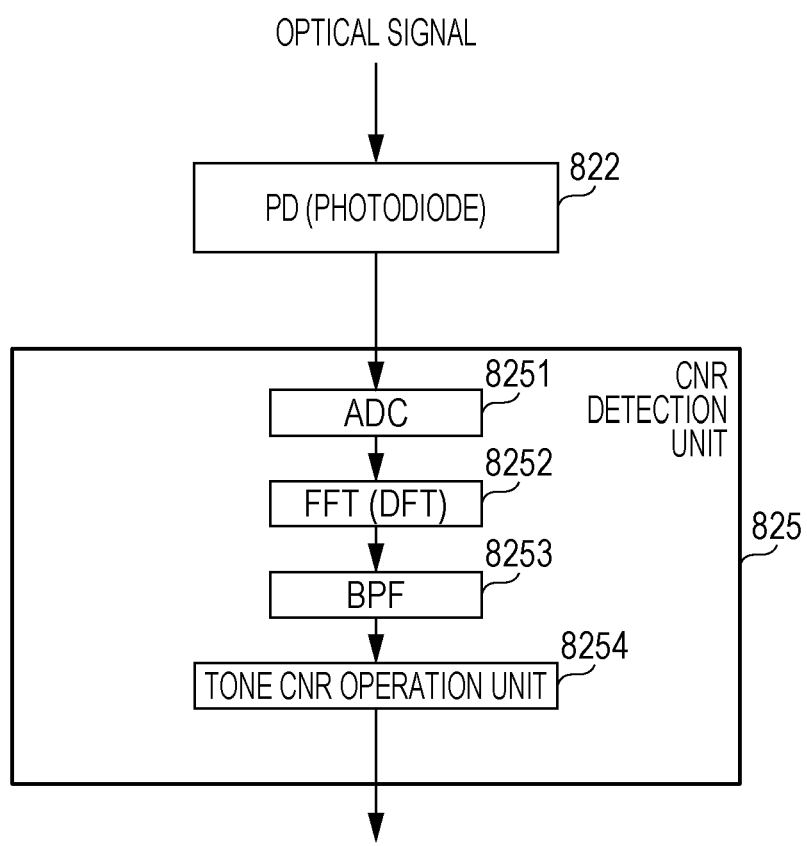
FIG. 12 is a block diagram illustrating an example of a configuration of a CNR detection unit illustrated in FIG. 11.

The CNR detection unit 825 detects a CNR, based on the voltage value of an electrical signal input from the PD 822. For this reason, the CNR detection unit 825 includes an ADC 8251, an FFT 8252, a BPF 8253, and a tone CNR operation unit 8254, for example, as illustrated in FIG. 12.

The ADC 8251 corresponds to the ADC 13 illustrated in FIG. 1, and converts an electrical signal input from the PD 822 to a digital signal.

The FFT 8252 corresponds to the FFT 14 illustrated in FIG. 1 and FIG. 9, and performs FFT processing on a digital signal input from the ADC 8251. Note that DFT processing may be performed in place of FFT processing. Thus, a digital signal input from the ADC 8251 is converted from the time-domain signal to the frequency-domain signal. The frequency-domain signal includes, as illustrated in FIG. 4, an FM tone signal component (refer to reference numeral 400) and a noise component (refer to reference numeral 500).

The BPF 8253 cancels the noise component included in an FFT processing result performed by the FFT 8252.

From the result of FFT processing performed by the FFT 14, the tone CNR operation unit 8254 determines a CNR, which is a power (intensity) ratio between the FM tone signal component and the noise component, by the foregoing formula (3. 1). The CNR determined from this is stored in the storage unit 826.

Referring back to FIG. 11, the storage unit 826 stores information obtained in the aforementioned detection units 823 to 825, the foregoing CNR versus OSNR table (or frequency deviation dependence table), control information used for control performed by the controllers 828 and 829 and the management unit 830, and so forth. The storage unit 826 corresponds to the storage unit 16 illustrated in FIG. 1 in terms of storing data indicating the relationship of the OSNR versus the CNR. A memory, such as a RAM or a ROM, may be, by way of example, used as the storage unit 826.

The operation unit 827 determines, for example, a wavenumber spectrum, a path ID, an OSNR, and so forth, based on information stored in the storage unit 826. For example, the operation unit 827 calculates a wavelength spectrum of monitor light, based on the power information of the monitor light detected by the optical power detection unit 823. Additionally, the operation unit 827 determines a path ID, for example, based on a path ID included in a path trace signal detected by the path trace signal detection unit 824. Furthermore, referring to data indicating the relationship of the OSNR versus the CNR based on a CNR determined in the CNR detection unit 825, the operation unit 827 determines an OSNR. The operation unit 827 corresponds to the operation unit 15 illustrated in FIG. 1 in terms of determining an OSNR from a CNR.

In other words, it may be understood that the tunable filter 821, the PD 822, the CNR detection unit 825, the storage unit 826, and the operation unit 827 form the OSNR monitoring device 1 illustrated in FIG. 1.

The N×1 optical-switch control unit 828 controls selection of input monitor light in the optical switch 81 by performing control so that any of input ports is selectively connected to an output port in accordance with control from the management unit 830.

The filter control unit 829 controls the central wavelength of the tunable filter 821 in accordance with control from the management unit 830, thereby controlling the wavelength of light caused to pass from the tunable filter 821 to the PD 822.

The management unit 830 gives control (instructions) to the controllers 828 and 829 as described above.

Note that, in the control block 900, all the units excluding the storage unit 826, the units 823 to 825 and 827 to 830, may be implemented, for example, using operation devices having operation capabilities, such as a CPU and a DSP.

(Explanation of Operations)

An example of processing of monitor light in the ROADM node 7 configured as described above will be explained with reference to FIG. 13 to FIG. 15.

Figure 13:
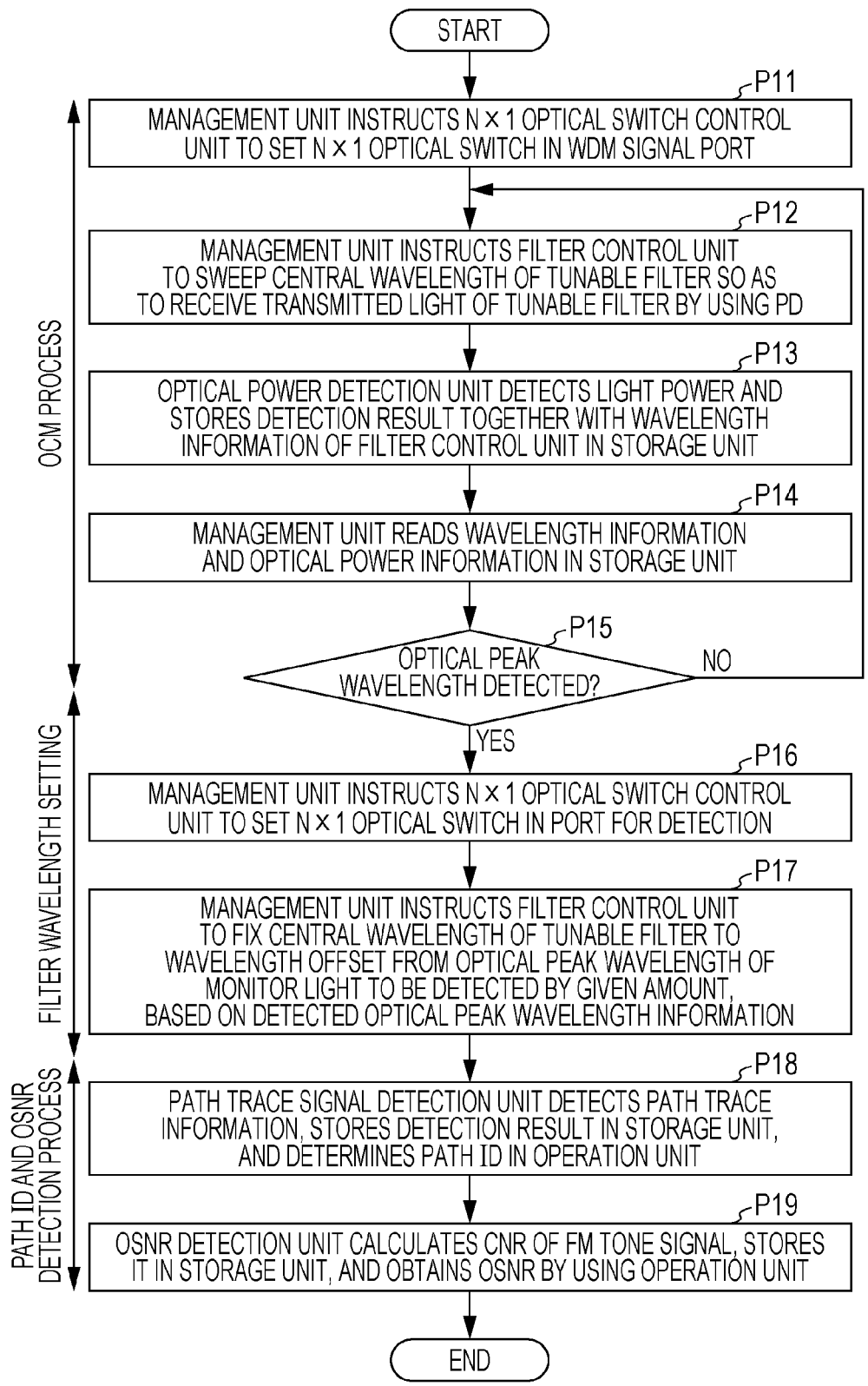
FIG. 13 is a flowchart for explaining an example of monitor processing in a ROADM node illustrated in FIG. 10 to FIG. 12.

As illustrated in FIG. 13, in the ROADM node 7, processing roughly classified into an OCM process (P11 to P15), filter wavelength setting (P16 and P17), and a path ID and OSNR detection process (P18 and P19) are performed.

First, paying attention to the OCM process, the management unit 830 of the control block 900 gives the N×1 optical switch control unit 828 an instruction for setting ports of the N×1 optical-switch control unit 81 (a port setting instruction) so that a WDM optical signal is input to the tunable filter 821. The N×1 optical-switch controller 828 performs port setting of the N×1 optical switch 81 in accordance with that port setting instruction (processing (hereinafter abbreviated as "P") 11).

Then, the management unit 830 gives the filter control unit 829 an instruction for sweeping the central wavelength of the tunable filter 821 (a sweep instruction). The filter control unit 829 sweeps the central wavelength of the tunable filter 822 in accordance with that sweep instruction. During sweep operations, transmitted light of the tunable filter 821 is received by the PD 822 (P12).

In the optical power detection unit 823, the power of light received by the PD 822 is detected based on an electrical signal that is in accordance with the power of light received by the PD 822 and is input from the PD 822. A detection result (received light power information), together with information on the central wavelength of the tunable filter 821 set by the filter control unit 829 at the point in time of detection of the power of received light, is stored in the storage unit 826. A plurality of sets of the received light power information and the wavelength information are obtained, and are stored in the storage unit 826 (P13).

Thereafter, the management unit 830 reads the wavelength information and the received light power information from the storage unit 826 (P14), and searches for a wavelength at which the received optical power is maximized (optical peak wavelength). If, as a result of searching, the optical peak wavelength is not detected (No in P15), the management unit 830 returns to P12, and repeats processing from P12 to P14 until the optical peak wavelength is detected (until Yes is determined in P15).

If the optical peak wavelength is detected (Yes in P15), the management unit 830 performs the filter wavelength setting process for detecting a path ID and an OSNR. For example, the management unit 830 gives the N×1 optical-switch control unit 828 a port setting instruction so that monitor light for which a path ID and an OSNR are to be detected is input to the tunable filter 821. The N×1 optical-switch control unit 828 performs port setting for the N×1 optical switch 81 in accordance with that port setting instruction (P16).

Then, the management unit 830 gives the filter control unit 829 an instruction for setting and fixing the central wavelength of the tunable filter 821 to a wavelength offset from the optical peak wavelength of the monitor light as the target for detection by a given amount, based on information on the optical peak wavelength detected in P15. The filter control unit 829 sets and fixes the central wavelength of the tunable filter 821 in accordance with that instruction (P17).

Once the central wavelength of the tunable filter 821 is fixed, the path ID and OSNR detection process is performed. For example, the path trace signal detection unit 824 detects a path trace signal from an electrical signal in accordance with the power of light received by the PD 822, and stores information on the detected path trace signal (path trace information) in the storage unit 826. Then, the operation unit 827 determines a path ID from the path trace information stored in the storage unit 826 (P18).

In contrast, the CNR detection unit 825 calculates the CNR of an FM tone signal, as already described, from an electrical signal in accordance with the power of light received by the PD 822, and stores the calculated CNR in the storage unit 826. Then, the operation unit 827 refers to the CNR versus OSNR table based on the CNR stored in the storage unit 826 to thereby determine an OSNR (P19).

Note that the order in which P18 and P19 are performed may be reversed, and P18 and P19 may also be performed in parallel. Additionally, any of the information on the optical peak wavelength detected in P15, the pass ID determined in P18, and the OSNR obtained in P19 may be output as a detection result (or a monitor result) through the management unit 830 to an external device. An example of the external device is a monitor device such as an operator terminal. The detection result is output to a display device or a printing device of the monitor device to be presented to a user such as the operator.

Figure 14:
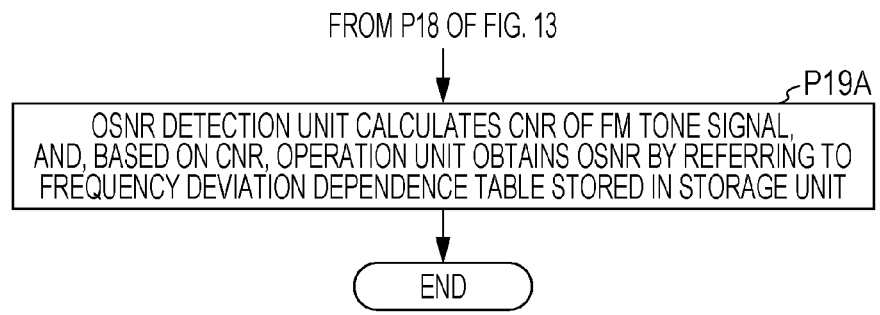
FIG. 14 is a flowchart for explaining a modification of the monitor processing illustrated in FIG. 13.

Furthermore, if the frequency deviation of an FM tone signal is changed as described with reference to FIG. 5 to FIG. 7, P19A illustrated in FIG. 14 may be performed in place of P19. For example, the CNR detection unit 825 calculates a CNR of the FM tone signal, and, based on that CNR, the operation unit 827 refers to the frequency deviation dependence table stored in the storage unit 826 to thereby determine an OSNR (P19A).

Figure 15:
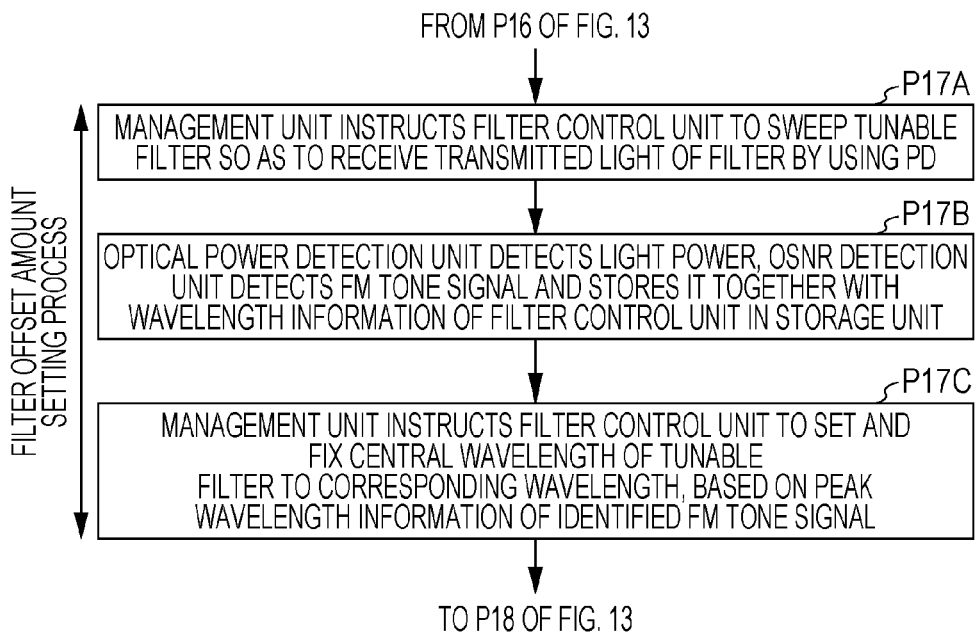
FIG. 15 is a flowchart for explaining a modification of the monitor processing illustrated in FIG. 13.

Additionally, setting of the filter offset amount described with reference to FIG. 8 may be implemented, for example, by performing P17A to P17C illustrated in FIG. 15 in place of P17 illustrated in FIG. 13. For example, the management unit 830 gives the filter control unit 829 an instruction (sweep instruction) for sweeping the central wavelength of the tunable filter 821. The filter control unit 829 sweeps the central wavelength of the tunable filter 822 in accordance with that sweep instruction. During sweeping operations, the transmitted light of the tunable filter 821 is received by the PD 822 (P17A).

In the optical power detection unit 823, the power of light received by the PD 822 is detected based on an electrical signal that is in accordance with the power of light received by the PD 822 and is input from the PD 822. Additionally, in the CNR detection unit 825, the CNR of an FM tone signal is calculated. The received light power information and the CNR obtained, together with information on the central wavelength (wavelength information) of the tunable filter 821 set by the filter control unit 829 at that point in time, are stored in the storage unit 826. A plurality of sets of the received light power information, the CNR, and the wavelength information are obtained in accordance with the sweeping operations, and are stored in the storage unit 826 (P17B).

Then, based on the received light power information, the CNR, and the wavelength information, the management unit 830 identifies wavelength information from which a peak of the FM tone signal is obtained, and gives the filter control unit 829 an instruction for setting the central wavelength of the tunable filter 821 so as to correspond to the identified wavelength information. The filter control unit 829 sets and fixes the central wavelength of the tunable filter 821 in accordance with that instruction (P17C).

As described above, in the aforementioned ROADM node 7, the tunable filter 821 and the PD 822 are shared, and commonly used for the OCM, the detection of a path trace signal, and the detection (monitor) of a CNR (OSNR). The storage unit 826 and the operation unit 827 are also shared, and commonly used for the OCM, the detection of a path trace signal, and the detection (monitor) of a CNR (OSNR).

In other words, existing components are also used for the OCM, the detection of a path trace signal in the ROADM node 7, and thus the OSNR monitoring device 1 of this embodiment may be applied to the ROADM node 7. That is, it is unnecessary for the ROADM node 7 to additionally include the tunable filter 821, the PD 822, the storage unit 826, and the operation unit 827 individually for OSNR monitoring. Accordingly, the ROADM node 7 including the OSNR monitoring device 1 is realizable with a simple configuration and at low cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device for monitoring optical signal, comprising:
an optical filter configured to allow part of a spectrum of an optical signal on which a frequency or phase modulated signal is superimposed to pass; and
a detection unit configured to detect signal quality of the optical signal, based on a power ratio of a signal component to a noise component of the modulated signal, the power ratio being obtained based on a power change in accordance with the modulated signal of light that has been caused to pass through the optical filter.

2. The device according to claim 1, wherein the optical filter has a central wavelength at a wavelength shifted with respect to a center wavelength of the spectrum.

3. The device according to claim 1, wherein the modulated signal is a signal modulated by a sinusoidal signal.

4. The device according to claim 1, wherein a first modulated signal and a second modulated signal are superimposed on the optical signal, and a frequency deviation of the first modulated signal differs from a frequency deviation of the second modulated signal.

5. The device according to claim 4, wherein one of the first and second modulated signals is a signal modulated by a sinusoidal signal, and a frequency deviation of the one of the modulated signals is smaller than a frequency deviation of the other of the modulated signals.

6. The device according to claim 5, wherein the frequency deviation of the one of the modulated signals is set in a range in which the power ratio obtained for the one of the modulated signals is lower than the power ratio obtained for the other of the modulated signals, and in which a change in the signal quality for a change in the power ratio is larger in the one of the modulated signals than in the other of the modulated signals.

7. The device according to claim 6, wherein the range is a range in which the power ratio obtained for the one of the modulated signals falls from 8 dB to 12 dB.

8. The device according to claim 5, wherein the other of the modulated signals includes one or both of information identifying an optical path and information on an optical transmitter that has transmitted the optical signal.

9. The device according to claim 1,
wherein the optical signal is a wavelength-division multiplexed signal including optical signals of a plurality of wavelengths, and
wherein the modulated signal is superimposed on an optical signal of a wavelength that is not adjacent to a wavelength of the modulated signal.

10. The device according to of claim 1,
wherein the optical filter is a tunable filter capable of changing a central wavelength, and
wherein the device for monitoring optical signal further comprises a filter control unit configured to perform a sweep of the central wavelength of the tunable filter, and to set the central wavelength at a wavelength at which power of the signal component of the modulated signal is maximized in accordance with the sweep.

11. The device according to claim 10,
wherein the optical signal is a wavelength-division multiplexed signal including optical signals of a plurality of wavelengths, and
wherein the tunable filter is shared with an optical channel monitor configured to sweep the central wavelength and to detect power of the optical signals of the plurality of wavelengths.

12. A method for monitoring optical signal, comprising:
allowing part of a spectrum of an optical signal on which a frequency or phase modulated signal is superimposed to pass, by using an optical filter; receiving light that has been caused to pass through the optical filter;
outputting an electrical signal in accordance with power of the received light;
performing a Fourier transform on the electrical signal;
calculating, from a result of the Fourier transform, a power ratio of a signal component to a noise component of the modulated signal based on a power change in accordance with the modulated signal of light that has been caused to pass through the optical filter;
storing data representing a relationship of the power ratio and signal quality of the optical signal; and
acquiring a measure of the signal quality for the calculated power ratio from the stored data.

13. A device for monitoring optical signal, comprising:
an optical filter configured to allow part of a spectrum of an optical signal on which a frequency or phase modulated signal is superimposed to pass;
an optical detector configured to receive light that has been caused to pass through the optical filter, and to output an electrical signal in accordance with power of the received light;
a Fourier transformer configured to perform a Fourier transform on the electrical signal;
at least one processor configured to calculate, from a result of the Fourier transform performed by the Fourier transformer, a power ratio of a signal component to a noise component of the modulated signal based on a power change in accordance with the modulated signal of light that has been caused to pass through the optical filter; and
a memory configured to store data representing a relationship of the power ratio and signal quality of the optical signal, wherein
the at least one processor is configured to acquire a measure of the signal quality for the calculated power ratio from the data stored in the memory.

14. The device according to of claim 13,
wherein the optical filter is a tunable filter capable of changing a central wavelength, and
wherein the device for monitoring optical signal further comprises at least one processor configured to perform a sweep of the central wavelength of the tunable filter, and to set the central wavelength at a wavelength at which power of the signal component of the modulated signal is maximized in accordance with the sweep.

15. The device according to claim 13,
wherein the optical signal is a wavelength-division multiplexed signal including optical signals of a plurality of wavelengths, and
wherein the modulated signal is superimposed on an optical signal of a wavelength that is not adjacent to a wavelength of the modulated signal.

16. The device according to claim 13, wherein a first modulated signal and a second modulated signal are superimposed on the optical signal, and a frequency deviation of the first modulated signal differs from a frequency deviation of the second modulated signal.

17. The device according to claim 16, wherein one of the first and second modulated signals is a signal modulated by a sinusoidal signal, and a frequency deviation of the one of the modulated signals is smaller than a frequency deviation of the other of the modulated signals.

18. The device according to claim 17, wherein the frequency deviation of the one of the modulated signals is set in a range in which the power ratio obtained for the one of the modulated signals is lower than the power ratio obtained for the other of the modulated signals, and in which a change in the signal quality for a change in the power ratio is larger in the one of the modulated signals than in the other of the modulated signals.

19. The device according to claim 14,
wherein the optical signal is a wavelength-division multiplexed signal including optical signals of a plurality of wavelengths, and
wherein the tunable filter is shared with an optical channel monitor configured to sweep the central wavelength and to detect power of the optical signals of the plurality of wavelengths.

* * * * *